(12) United States Patent
Akaike

(10) Patent No.: US 7,226,386 B2
(45) Date of Patent: Jun. 5, 2007

(54) VEHICLE TRANSMISSION CONTROL SYSTEM

(75) Inventor: Tsutomu Akaike, Fuji (JP)

(73) Assignee: JATCO Ltd, Fuji-shi (JP)

( * ) Notice: Subject to any disclaimer, the term of this patent is extended or adjusted under 35 U.S.C. 154(b) by 284 days.

(21) Appl. No.: 11/085,013

(22) Filed: Mar. 21, 2005

(65) Prior Publication Data

US 2005/0221955 A1 Oct. 6, 2005

(30) Foreign Application Priority Data

Mar. 30, 2004 (JP) ............................. 2004-100926

(51) Int. Cl.
- B60W 10/02 (2006.01)
- F16H 59/64 (2006.01)
- G06F 7/00 (2006.01)

(52) U.S. Cl. ........................... 477/80; 477/76; 477/98; 701/59

(58) Field of Classification Search .................. 477/53, 477/70, 76, 79, 80, 98, 156, 158, 159; 701/51, 701/66, 58, 59
See application file for complete search history.

(56) References Cited

U.S. PATENT DOCUMENTS 5,562,571 A * 10/1996 Maruyama et al. .......... 477/174
5,873,803 A * 2/1999 Geon .......................... 477/158
6,016,456 A * 1/2000 Yu ................................ 701/55
6,659,912 B2 * 12/2003 Takatori et al. .............. 477/117

FOREIGN PATENT DOCUMENTS

JP 2003-74683 A 3/2003

OTHER PUBLICATIONS

U.S. Appl. No. 11/085,011, filed Mar. 21, 2005, Akaike.

* cited by examiner

Primary Examiner—Roger Pang
(74) Attorney, Agent, or Firm—Foley & Lardner LLP

(57) ABSTRACT

Clutch pressure is reduced to an initial pressure, and a transmission operation state is stored, when a vehicle is stopped with an engine in an idling state. The clutch pressure is further reduced at a constant change rate and the amount of time is measured until the turbine rotation speed increases to the predetermined rotation speed. Based on the measured amount of time, a correction amount is computed for the initial pressure necessary to increase the turbine rotation speed to the predetermined rotation speed in a predetermined amount of time. The correction amount is stored in a memory region corresponding to the transmission operation state when the clutch pressure is reduced to the initial pressure. The initial pressure is corrected according to the correction amount stored in the memory region corresponding to the transmission operation state when the clutch pressure is reduced.

5 Claims, 5 Drawing Sheets

VEHICLE TRANSMISSION CONTROL SYSTEM

FIELD OF THE INVENTION

This invention relates to a transmission control system used in a vehicle.

BACKGROUND OF THE INVENTION

JP2003-74683A, published by the Japan Patent Office in 2003, discloses neutral control that reduces hydraulic pressure supplied to an automatic transmission clutch to maintain the clutch in a state immediately prior to engagement when a vehicle is stopped in an engine idling state.

SUMMARY OF THE INVENTION

Feedback control is often performed during neutral control. In feedback control, the amount of time it takes from a point at which the clutch pressure reduction begins, up to a point at which the rotation speed of a turbine runner (turbine rotation speed) reaches a predetermined rotation speed, is made constant over different automatic transmission operation states. Correction values are computed based on the difference between a target value and the actual amount of time needed for the turbine rotation speed to reach the predetermined rotation speed. The correction values are then used to enhance control performance in subsequent clutch pressure reductions. Each of the correction values is stored in a memory in association with the operation state of the automatic transmission at the point where the turbine rotation speed reaches the predetermined rotation speed and the correction value is set.

With this method, however, correction values are not stored in correct regions of the memory if different automatic transmission operation states exist at the point where the clutch pressure reduction begins and at the point where the correction values are set and stored. Since the correction values are used at the start of the clutch pressure reduction, it is thus necessary to store each of the correction values in association with the automatic transmission operation state at the start of the clutch pressure reduction. Appropriate correction values cannot be obtained when the correction values are not stored in the appropriate regions, and this makes it difficult to perform control so that the actual amount of time necessary becomes equal to the target value.

It is therefore an object of this invention to store correction values in appropriate regions of a memory, and to perform control so that the amount of time from a point at which a clutch pressure begins to decrease, until a point at which a turbine rotation speed reaches a predetermined value, becomes equal to a target value.

In order to achieve above object, this invention provides a transmission control system comprising: an automatic transmission connected to an engine, the automatic transmission comprising a torque converter and a power transmission clutch that is engaged when supplied with hydraulic pressure at vehicle start; a hydraulic pressure circuit that supplies hydraulic pressure to the power transmission clutch; and a controller connected to the hydraulic circuit to control the hydraulic circuit.

The controller has a plurality of memory regions partitioned according to the operation state of the automatic transmission; reduces the hydraulic pressure supplied from the hydraulic pressure circuit to the power transmission clutch to become an initial hydraulic pressure when the vehicle is stopped with the engine in an idling state; stores the operation state of the automatic transmission when the hydraulic pressure supplied to the power transmission clutch is reduced to the initial hydraulic pressure; further reduces, at a constant rate of change, the hydraulic pressure supplied to the power transmission clutch after the hydraulic pressure supplied to the power transmission clutch is reduced to the initial hydraulic pressure until a turbine rotation speed of the torque converter increases to a predetermined rotation speed; measures the amount of time from when the hydraulic pressure starts decreasing at the constant rate of change until the turbine rotation speed increases to the predetermined rotation speed, and computes, based on the measured amount of time, a correction amount for the initial hydraulic pressure necessary in order to increase the turbine rotation speed to the predetermined rotation speed in a predetermined amount of time; and stores the correction amount for the initial hydraulic pressure in a memory region that corresponds to the operation state of the automatic transmission when the hydraulic pressure supplied to the power transmission clutch is reduced to the initial hydraulic pressure.

In reducing the hydraulic pressure supplied from the hydraulic circuit to the power transmission clutch to the initial hydraulic pressure, the initial hydraulic pressure is corrected according to a correction amount for the initial hydraulic pressure stored in the memory region corresponding to the operation state of the automatic transmission when the hydraulic pressure supplied to the power transmission clutch is reduced.

The details as well as other features and advantages of this invention are set forth in the remainder of the specification and are shown in the accompanying drawings.

DETAILED DESCRIPTION OF THE PREFERRED EMBODIMENTS

Figure 1:
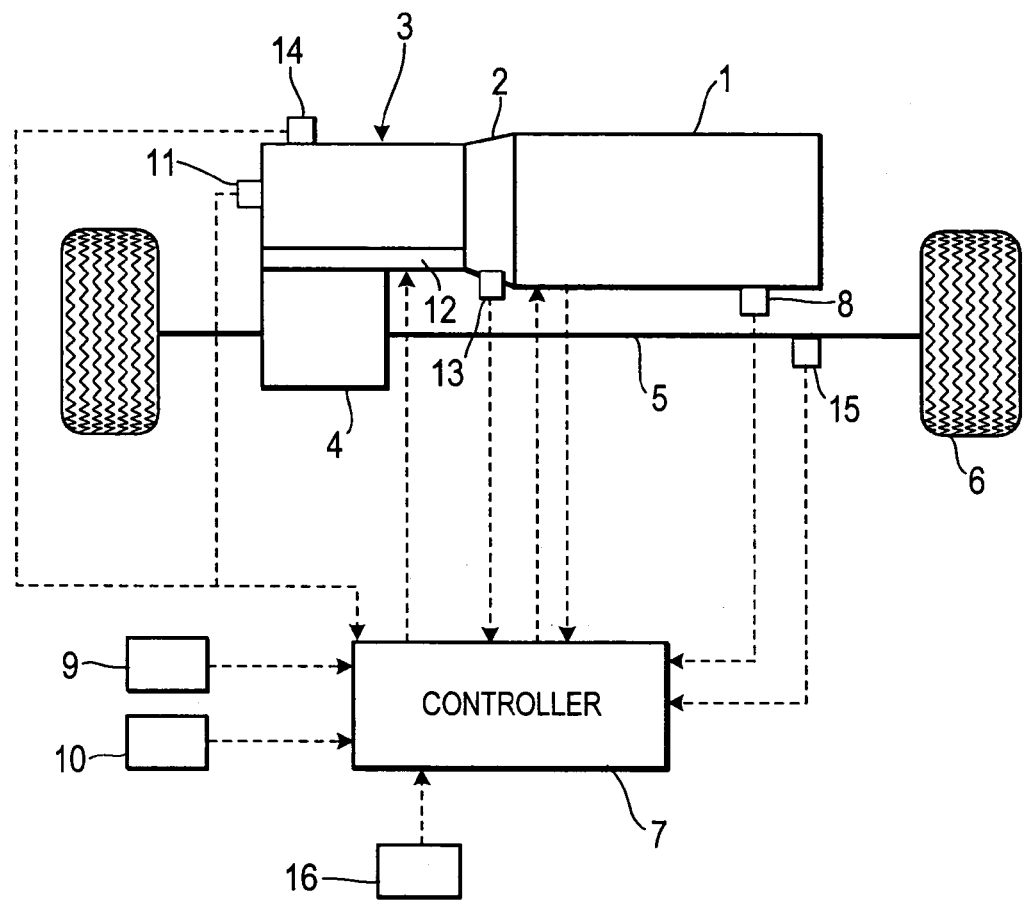
FIG. 1 is a schematic block diagram of a transmission control system according to this invention.

FIG. 1 is a block diagram of a transmission control system according to this invention. Rotation of an engine 1 is transmitted to an automatic transmission 3. The rotation is transmitted to drive wheels 6, through a differential gear unit 4, and a drive shaft 5, after undergoing a speed change by the automatic transmission 3. The automatic transmission 3 comprises a torque converter 2, and a hydraulic pressure circuit 12 that regulates the hydraulic pressure supplied to constituent elements of the automatic transmission 3.

Figure 2:
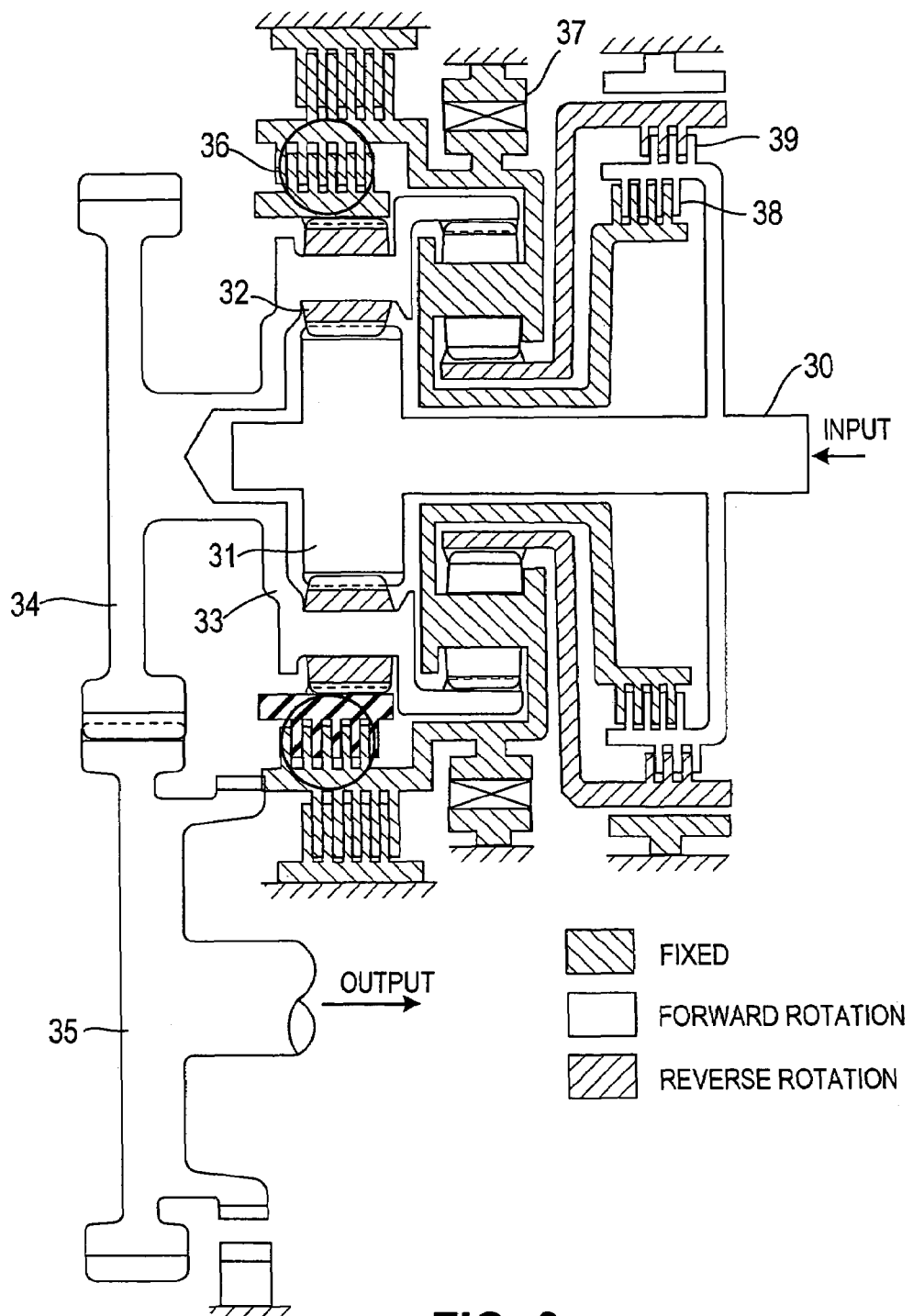
FIG. 2 is a block diagram of an automatic transmission.

FIG. 2 is a block diagram of portions other than the torque converter 2 of the automatic transmission 3. FIG. 2 shows a state of the automatic transmission 3 when a running range such as a drive (D) range, a second gear (2) range, or a low (L) range is selected. Power input to an input shaft 30 is transmitted to a planetary gear 32 through a sun gear 31 of a planetary gear mechanism provided in an end portion of the input shaft 30. The power transmitted to the planetary gear 32 is then transmitted from a carrier 33 to an output gear 34, and output from an idler gear 35 that meshes with the output gear 34. When a vehicle starts to move forward from a stopped state, a low clutch 36 is engaged, a one-way clutch 37 operates, and a high clutch 38 and a reverse clutch 39 are released.

A controller 7 that comprises one or a plurality of microprocessors, an input-output interface, read only memory (ROM), and random access memory (RAM) controls the transmission control system.

Outputs from a sensor 8 that detects the rotation speed of the engine 1, a sensor 9 that detects the position of a select lever, a sensor 10 that detects the operation amount of a brake pedal, a sensor 11 that detects a hydraulic pressure Pc supplied to the clutch 36 within the automatic transmission 3, a sensor 13 that detects a rotation speed N of the turbine runner of the torque converter 2 (hereinafter called turbine rotation speed), a sensor 14 that detects an oil temperature To of the automatic transmission 3, a sensor 15 that detects the speed of the vehicle, and a sensor 16 that detects the operation amount of the accelerator pedal are all input to the controller 7.

When the vehicle is stopped with the engine 1 in an idling state, the controller 7 performs neutral control to maintain the clutch 36 in a state immediately prior to engagement by decreasing the hydraulic pressure supplied from the hydraulic pressure circuit 12 to the low clutch 36.

Neutral control is started when conditions (i) to (v) described below are all met, for example.

(i) The vehicle is in a stopped state (=vehicle speed is zero).

(ii) The engine 1 is at a speed equal to or greater than a predetermined speed.

(iii) The select lever is in the driving range.

(iv) The accelerator pedal is released.

(v) The brake pedal has been depressed for a period of time equal to or greater than a predetermined period of time.

The conditions for starting neutral control are deemed not to be met when any one of the conditions (i) to (v) is not met. It should be noted that the conditions for starting neutral control are not limited to the conditions described above. More conditions than those listed above, and conversely fewer conditions than those listed above, may also be used.

Neutral control performed by the controller 7 is described next.

First, when the conditions for starting neutral control are met, the controller 7 instantaneously reduces the clutch pressure Pc supplied to the low clutch 36 to an initial pressure p1. The initial pressure p1 is a value that has been corrected by a correction value $\lambda$ stored in a memory region corresponding to the operation state of the automatic transmission 3 when the clutch pressure Pc is reduced. The clutch pressure Pc is then reduced gradually at a constant rate of change. The torque capable of being transmitted by the low clutch 36 decreases, and the turbine rotation speed N of the torque converter 2 increases, when the clutch pressure Pc is decreased.

An amount of time T1 from after the clutch pressure Pc is reduced until the turbine rotation speed N reaches a target rotation speed N1 is measured in advance. The measured amount of time T1 is then compared to a target amount of time Tt, and the correction value $\lambda$ for the initial pressure p1 of the clutch pressure Pc is set based on the result of the comparison.

Figure 3:
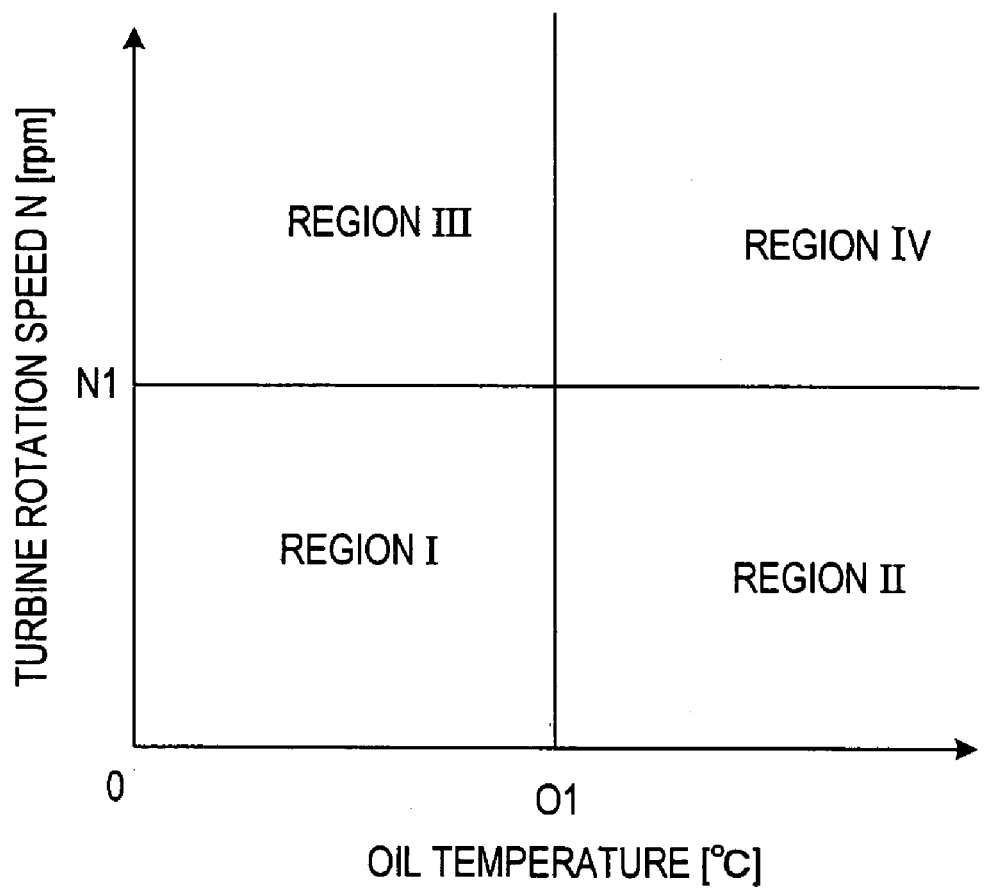
FIG. 3 is a conceptual diagram of regions in which correction values for initial values are stored.

Referring to FIG. 3, the correction value $\lambda$ is stored in a memory region of the RAM within the controller 7. The memory region is partitioned according to the turbine rotation speed N and the oil temperature To of the automatic transmission 3, which constitute the running state of the automatic transmission 3. Symbol N1 in FIG. 3 denotes the target rotation speed for the turbine rotation speed (500 rpm, for example), and symbol ○1 denotes a predetermined temperature (50° C., for example). According to this invention, the operation state of the automatic transmission 3 (the turbine rotation speed N and the oil temperature To of the automatic transmission 3) at the point when the clutch pressure Pc is reduced to the initial pressure p1 is stored, and the set correction value $\lambda$ is stored in a memory region corresponding to the stored operation state of the automatic transmission 3.

Figure 4:
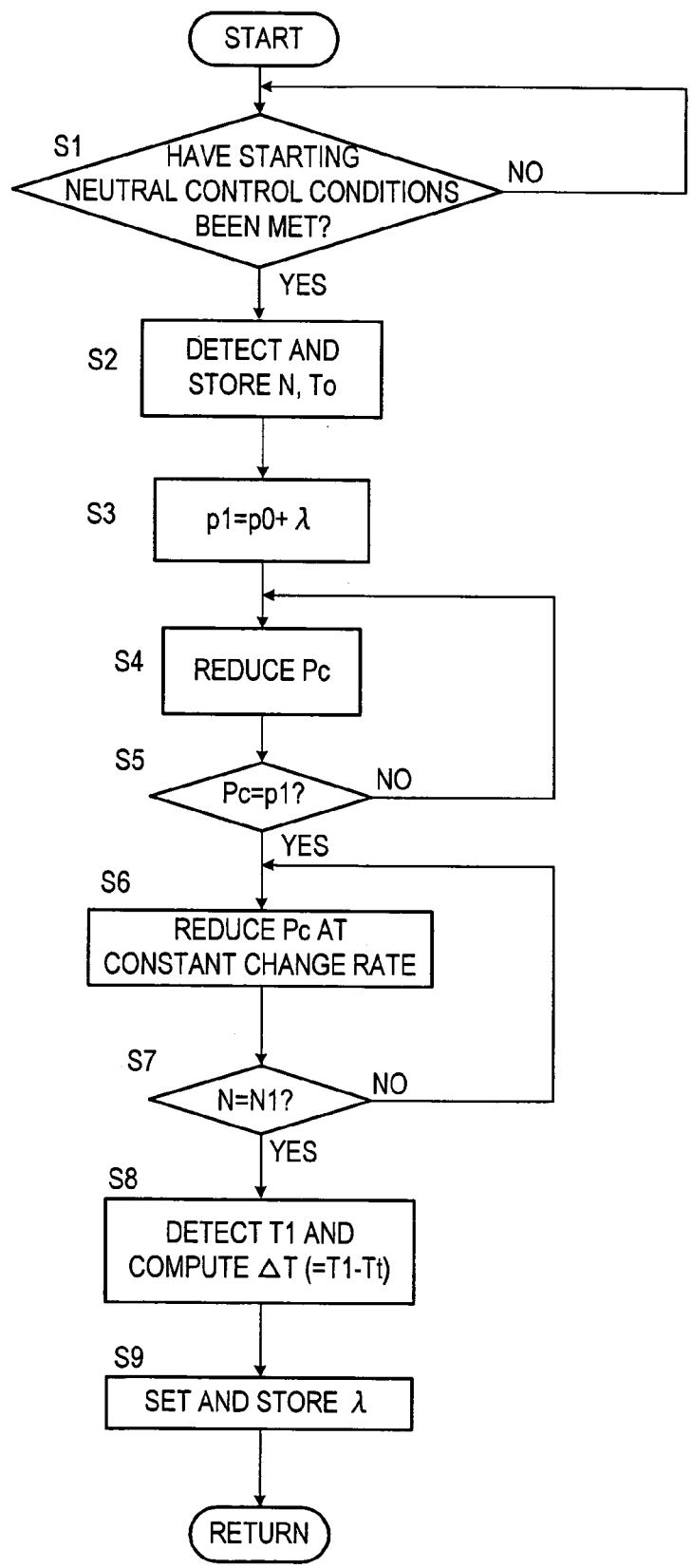
FIG. 4 is a flowchart of neutral control.

The contents of neutral control are explained while referring to a flowchart of FIG. 4.

First, in a step S1, a determination is made as to whether the conditions for starting neutral control have been met, and if met, processing proceeds to a step S2. The determination of the step S1 is repeated if the conditions for starting neutral control have not been met.

In the step S2, the turbine rotation speed N and the oil temperature To of the automatic transmission 3 are detected as the operation state of the automatic transmission 3, and stored in the RAM of the controller 7.

In a step S3, a memory region of the RAM is determined corresponding to the detected turbine rotation speed N and the oil temperature To of the automatic transmission 3, and the stored correction value $\lambda$ is then read out from the determined memory region. The correction value $\lambda$ is then added to a base value p0 (predetermined value) for the initial pressure p1, thus setting the initial pressure p1.

In a step S4, the clutch pressure Pc is instantaneously reduced to the initial pressure p1 set in the step S3.

In a step S5, a determination is made as to whether the clutch pressure Pc has decreased to the initial pressure p1, and if so, processing proceeds to a step S6. Otherwise, processing returns to the step S4 and the clutch pressure Pc continues to be reduced.

In the step S6, the clutch pressure Pc is reduced gradually from the initial pressure p1 at a constant rate of change.

In a step S7, the turbine rotation speed N is read in, and a determination is made as to whether the turbine rotation speed N has reached the target rotation speed N1. If the target rotation speed N1 has been reached, processing proceeds to a step S8. Otherwise, processing returns to the step S6 and the clutch pressure Pc is further reduced at the constant rate of change.

In the step S8, the amount of time T1 from when the clutch pressure Pc begins to decrease at the constant rate of change until the turbine rotation speed N reaches the target rotation speed N1 is measured, and a time difference $\Delta T(=T1-Tt)$ between the measured amount of time T1 nd the target amount of time Tt is computed.

In a step S9, the correction value $\lambda$ is set based on the time difference $\Delta T$ computed in the step S8. For example, a correction amount $\Delta\lambda 1$ (>0) for when the time difference $\Delta T$ is negative and a correction amount $\Delta\lambda 2$ (<0) for when the time difference $\Delta T$ is positive may be set in advance, and $\Delta\lambda 1$ or $\Delta\lambda 2$ is then added to the correction value $\lambda$ depending upon the sign of the time difference $\Delta T$, thus setting a new correction value $\lambda$. Accordingly, when the initial pressure p1 is high and the measured amount of time T1 is longer than the predetermined amount of time Tt, the correction value $\lambda$ is set to reduce the initial pressure p1. When the initial pressure p1 is low and the measured amount of time T1 is shorter than the predetermined amount of time Tt, the correction value $\lambda$ is set to increase the initial pressure p1.

The correction value $\lambda$ is then stored in the memory region of the RAM corresponding to the turbine rotation speed N and the oil temperature To of the automatic transmission 3 at the point when the clutch pressure Pc is reduced to the initial pressure p1, which are stored in the step S2.

Figure 5:
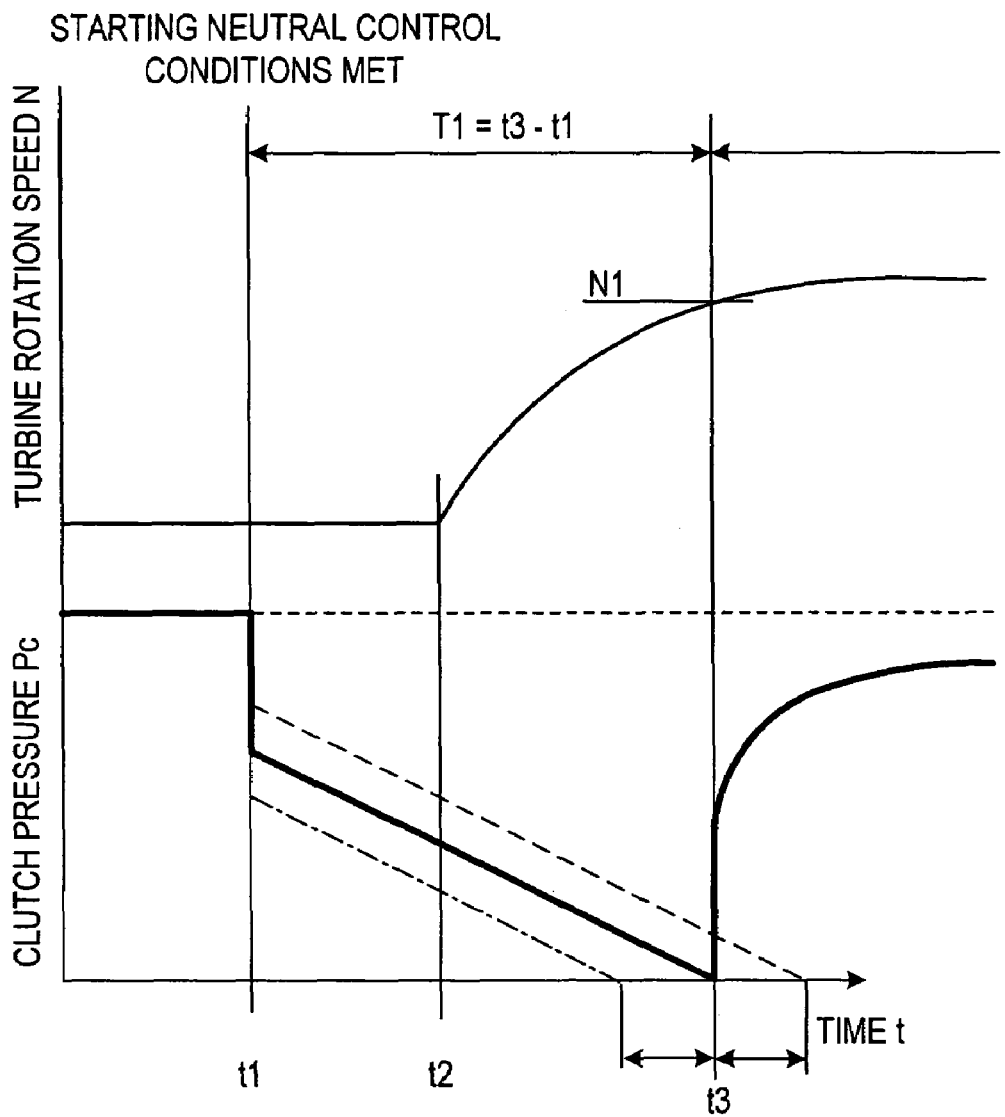
FIG. 5 is a timing chart that shows a state when neutral control is performed.

FIG. 5 is a timing chart that shows a state when neutral control is performed.

When the conditions for starting neutral control are met at a time t1, the controller 7 instantaneously reduces the hydraulic pressure Pc supplied to the clutch 36 to the initial pressure p1. Once the hydraulic pressure Pc has decreased to the initial pressure p1, the hydraulic pressure Pc is further reduced at a constant rate of change.

The drive force that can be transmitted by the clutch 36 becomes smaller as the clutch pressure Pc is reduced at the constant rate of change from the initial pressure p1. Accordingly, the clutch 36 begins to slip at a time t2, and the turbine rotation speed N of the torque converter 2 begins to increase.

When the clutch pressure Pc is further reduced at the constant rate of change, the turbine rotation speed N increases further, reaching the target rotation speed N1 at a time t3.

After the target rotation speed N1 has been reached, the clutch pressure Pc is controlled so that the turbine rotation speed N maintains a constant rotation speed difference (slip amount) between it and the engine rotation speed.

In the above neutral control, the amount of time T1 from when the clutch pressure Pc is reduced until the turbine rotation speed N reaches the target rotation speed N1 is controlled so as to become the predetermined target amount of time Tt. Although individual dispersions may exist in the rate of decrease of the clutch pressure Pc and in the speed of increase of the turbine rotation speed N, dispersion in the amount of time for neutral control to converge can be curbed when the amount of time T1 is controlled so as to become the target amount of time Tt.

Specifically, the initial pressure p1 is corrected so that the amount of time T1 from the time t1, when the clutch pressure Pc is reduced to the initial pressure p1, to the time t3, when the turbine rotation speed N reaches the target rotation speed N1, becomes the target amount of time Tt. When the amount of time T1 is longer than the target amount of time Tt, the correction value $\lambda$ is reduced in order to lower the initial pressure p1. On the other hand, when the amount of time T1 is shorter than the target amount of time Tt, the correction value $\lambda$ is increased in order to increase the initial pressure p1. The correction value $\lambda$ of the initial pressure p1 set at the time t3 is then stored in the memory region of the RAM that corresponds to the operation state of the automatic transmission 3 (the turbine rotation speed N and the oil temperature To of the automatic transmission 3) detected at the time t1.

The correction value $\lambda$ is stored in the memory region corresponding to the operation state of the automatic transmission 3 when starting to decrease the hydraulic pressure, and not in a memory region that corresponds to the operation state of the automatic transmission 3 when the correction value is set. An appropriate correction value $\lambda$ can thus be obtained when the hydraulic pressure is next reduced by reading out the value from the memory region of the RAM corresponding to the operation state of the automatic transmission at that point. The initial pressure p1, which is the target hydraulic pressure for when the clutch pressure is reduced, can thus be suitably corrected. In addition, control can be performed so that the amount of time necessary for the turbine rotation speed N to reach the target rotation speed N1 becomes the target amount of time Tt.

What is claimed is:

1. A transmission control system comprising:
   an automatic transmission connected to an engine, the automatic transmission comprising a torque converter and a power transmission clutch that is engaged when supplied with hydraulic pressure at vehicle start;
   a hydraulic pressure circuit that supplies hydraulic pressure to the power transmission clutch; and
   a controller connected to the hydraulic circuit to control the hydraulic circuit, wherein the controller:
      has a plurality of memory regions partitioned according to an operation state of the automatic transmission;
      reduces the hydraulic pressure supplied from the hydraulic pressure circuit to the power transmission clutch to become an initial hydraulic pressure when the vehicle is stopped with the engine in an idling state;
      stores the operation state of the automatic transmission when the hydraulic pressure supplied to the power transmission clutch is reduced to the initial hydraulic pressure;
      further reduces, at a constant rate of change, the hydraulic pressure supplied to the power transmission clutch after the hydraulic pressure supplied to the power transmission clutch is reduced to the initial hydraulic pressure until a turbine rotation speed of the torque converter increases to a predetermined rotation speed;
      measures the amount of time from when the hydraulic pressure starts decreasing at the constant rate of change until the turbine rotation speed increases to the predetermined rotation speed, and computes, based on the measured amount of time, a correction amount for the initial hydraulic pressure necessary in order to increase the turbine rotation speed to the predetermined rotation speed in a predetermined amount of time; and
      stores the correction amount for the initial hydraulic pressure in a memory region that corresponds to the operation state of the automatic transmission when the hydraulic pressure supplied to the power transmission clutch is reduced to the initial hydraulic pressure,
   wherein, in reducing the hydraulic pressure supplied from the hydraulic circuit to the power transmission clutch to the initial hydraulic pressure, the initial hydraulic pressure is corrected according to a correction amount for the initial hydraulic pressure stored in the memory region corresponding to the operation state of the automatic transmission when the hydraulic pressure supplied to the power transmission clutch is reduced.

2. The transmission control system as defined in claim 1, wherein when the measured amount of time is longer than the predetermined amount of time, the controller computes the correction amount for the initial hydraulic pressure so as to reduce the initial hydraulic pressure.

3. The transmission control system as defined in claim 1, wherein when the measured amount of time is shorter than the predetermined amount of time, the controller computes the correction amount for the initial hydraulic pressure so as to increase the initial hydraulic pressure.

4. The transmission control system as defined in claim 1, wherein the operation state of the automatic transmission comprises the turbine rotation speed of the torque converter.

5. The transmission control system as defined in claim 1, wherein the operation state of the automatic transmission comprises an oil temperature of the automatic transmission.

* * * * *